Dec. 27, 1955     R. E. NELSON     2,728,308
DOUGH PUMP Filed Nov. 12, 1953     5 Sheets-Sheet 1

Fig.1

INVENTOR.
Robert E. Nelson
BY
Otto Moeller
Attorney

Dec. 27, 1955 R. E. NELSON 2,728,308
DOUGH PUMP
Filed Nov. 12, 1953 5 Sheets-Sheet 2

INVENTOR.
Robert E. Nelson
BY
Otto Moeller
Attorney

Dec. 27, 1955  R. E. NELSON  2,728,308
DOUGH PUMP

Filed Nov. 12, 1953 5 Sheets-Sheet 3

INVENTOR.
Robert E. Nelson
BY
Otto Moeller
Attorney

Dec. 27, 1955  R. E. NELSON  2,728,308
DOUGH PUMP
Filed Nov. 12, 1953  5 Sheets-Sheet 4

INVENTOR.
Robert E. Nelson
BY
*Otto Moeller*
Attorney

Dec. 27, 1955  R. E. NELSON  2,728,308
DOUGH PUMP

Filed Nov. 12, 1953  5 Sheets-Sheet 5

INVENTOR.
Robert E. Nelson
BY
Otto Moeller
Attorney

United States Patent Office 2,728,308
Patented Dec. 27, 1955

2,728,308
DOUGH PUMP

Robert E. Nelson, Rosamond, Calif., assignor to Read Standard Corporation, New York, N. Y., a corporation of Delaware Application November 12, 1953, Serial No. 391,437

11 Claims. (Cl. 107—14)

This invention relates broadly to dough handling apparatus and more specifically to a pump which is capable of delivering under pressure, and at a constant and determinable rate, a viscous and semi-compressible material of somewhat sticky tendencies.

The present day commercial practice of handling dough, such as bread dough, is to move or convey a batch of dough through a series of steps or operations to properly prepare the dough for delivery to the baking oven. The series of steps or operations through which the batch of dough passes consists amongst others of dividing the dough into predetermined masses, rounding each mass of dough to seal up the raw sides of the dough resulting from the shearing action of the divider, then proofing the mass of dough after which it is molded and panned for delivery to the baking oven. Each of the above enumerated operations requires a particular piece of machinery to perform the prescribed operation and each operation entails a certain amount of time in properly preparing the dough before it is ready for the baking oven.

It has only been of recent date wherein efforts have meen successfully directed to devising dough handling apparatus which would be capable of molding, rounding, and dividing a batch of dough that could be panned and delivered to the baking oven. This type of apparatus generally consists of an extruding mechanism having a cut-off mechanism associated therewith for dividing the extruded pieces of dough into lengths suitable for panning and delivery to the baking oven. In addition it has been customary to employ with the extruder and cut-off mechanism an apparatus of some type that is capable of delivering to the extruder a mass of dough under pressure and during the delivery of the dough to the extruder and its passage therethrough the mass of dough is molded.

An object of the present invention is to provide a pump that is readily adaptable for use with a dough extruding device in that it is capable of delivering a mass of dough at a constant and determinable rate under pressure, and in such a manner as to avoid the entrapment of air within the dough mass which interferes with and renders impossible an accurate volumetric scaling and measuring of dough pieces.

Another object is to provide a dough pump for use with a dough extruding device that minimizes punishment of the dough and that effects delivery of dough of uniform density permitting accurate volumetric scaling by suitable cut-off means.

Another object of the present invention is to provide a dough pump casing with a pair of rotors having offset undulating surfaces for receiving and delivering under pressure a mass of dough at a constant and determinable rate.

Another object is to provide a dough pump casing having rotors with peripheral offset dough pockets arranged to receive therein masses of dough that are conveyed to a restricted part of the casing for pumping from the casing under a positive pressure the entrapped pocketed segments of dough.

Another object is to provide a dough pump casing with a pair of rotors having offset undulating surfaces engageable by a stripper assembly for removing a mass of dough from the rotors.

Another object is to provide a dough pump casing having rotors with peripheral offset dough receiving pockets engageable by stripping assemblies to deliver masses of dough from the pockets whereby the individual masses of dough delivered from the pockets will be at a constant and uniform rate of discharge.

A further object is to provide a dough pump casing having rotors with peripheral offset dough receiving pockets engageable by stripper assemblies that are so connected as to transmit motion from one to another whereby one stripper upon moving out of a pocket causes another stripper to descend into a pocket.

A further object is to provide a dough pump casing with a pair of rotors having offset pocketed surfaces engageable by stripper assemblies with one stripper engaging the crest of a pocket on one rotor contemporaneous with the other stripper engaging the deepest point of a pocket on the other rotor for delivering dough from the casing at a constant and determinable rate.

Still further objects are to provide a dough pump that is readily accessible for cleaning, capable of handling materials of varying consistency and economical of manufacture.

Other objects and advantages more or less ancillary to the foregoing and the manner in which all of the various objects are realized will appear in the following description which, considered in connection with the accompanying drawings, sets forth the preferred embodiment of the invention.

Referring to the drawings wherein the preferred embodiment of the invention is illustrated.

Figure 2:
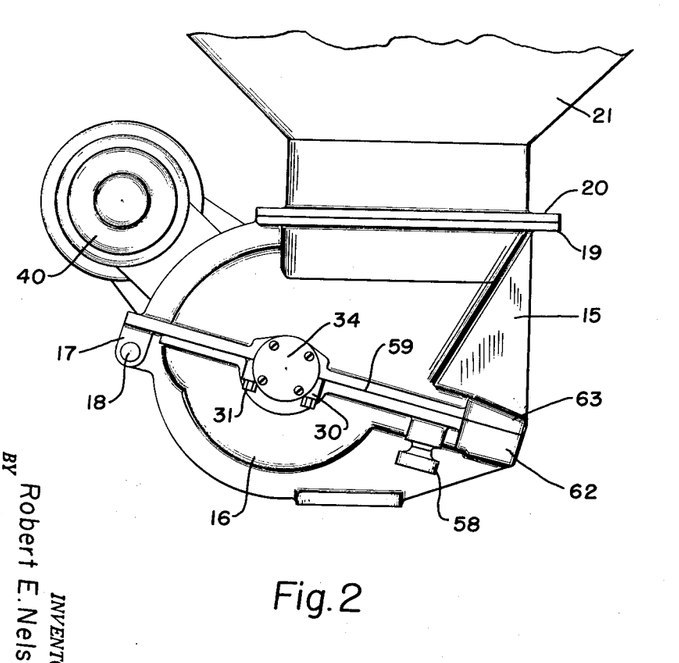
Figure 2 is a side elevational view of the dough pump showing a portion of the feeding hopper.
Figure 3:
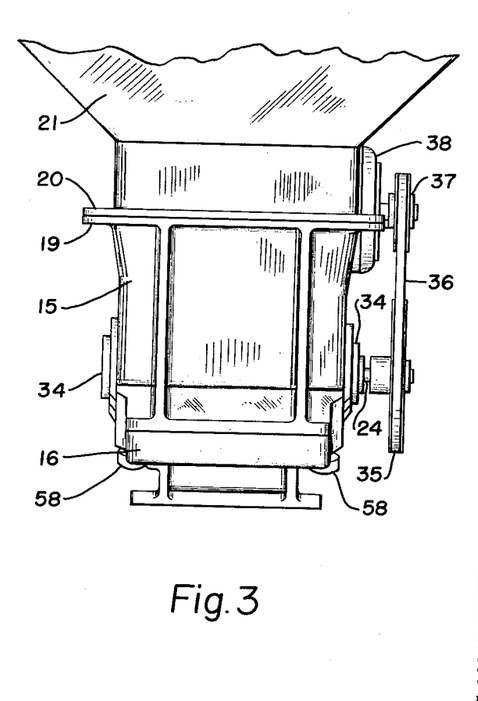
Figure 3 is an end elevational view of the dough pump showing the drive mechanism.

Referring to the drawings there is shown in Figures 2 and 3 a pump casing consisting of an upper or top portion 15 and a lower or bottom portion 16. The upper portion 15 of the pump casing is provided at one end with a pair of spaced depending flanges 17 in which is mounted a pin 18 carried by the lower portion 16 so that the lower portion 16 is pivotally mounted on the upper portion 15 of the pump casing. The upper portion 15 of the pump casing is formed with an outwardly projecting flange 19, of a generally rectangular configuration, upon which is mounted, in any suitable manner, the flange 20 of a complementary configuration provided on the bottom portion of a dough hopper 21.

Figure 4:
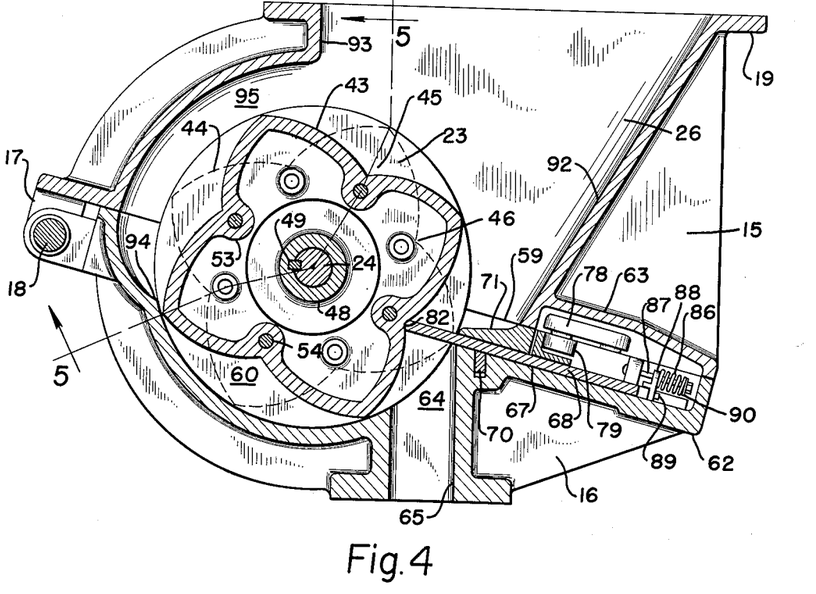
Figure 4 is a vertical sectional view showing the rotors and one of the stripper assemblies mounted in the casing, the view being taken on a plane indicated by the line 4—4 of Figure 5.
Figure 5:
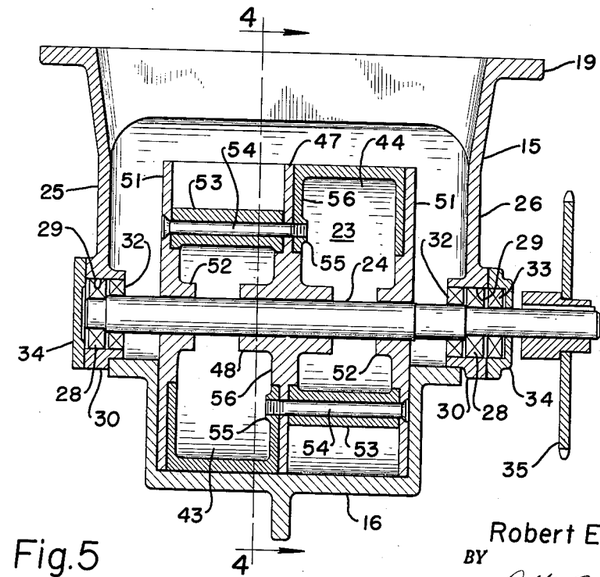
Figure 5 is a vertical sectional view showing the rotors and their drive shaft mounted in the dough pump casing, the view being taken on the irregular line 5—5 of Figure 4.

As shown in Figures 4 and 5 a pump or rotor assembly 23 is mounted on a shaft 24 that is supported in the side walls 25 and 26 of the upper portion 15 of the pump casing. The shaft 24 is supported in suitable bearings 28 which are positioned in bores 29 provided in the lower portion of the side walls 25 and 26. The bearings 28 and shaft 24 are retained in the bores 29 by suitable bearing caps 30 that are secured to the upper pump casing portion 15 by suitable bolts 31, Figure 2. The shaft 24 is also provided, adjacent its respective ends, with inner shaft seals 32 which are positioned within the bores 29 thereby insuring that dough will not flow along the shaft 24 and out of the pump casing. One end of the shaft 24 extends through an outer seal 33 and projects out of the upper pump casing 15. Suitable end caps 34, Figures 2 and 5, are secured to the upper pump casing portion 15 for retaining the shaft and shaft assembly within the casing. The portion of the shaft 24 which projects out of the pump casing portion 15 has secured thereto a sprocket 35, Figures 3 and 5, over which is entrained a sprocket chain 36. The sprocket chain 36 is also entrained over a second sprocket 37 which is connected to and driven by a conventional variable speed reduction drive 38 which is carried by a motor 40 supported on the pump casing.

Figure 1:
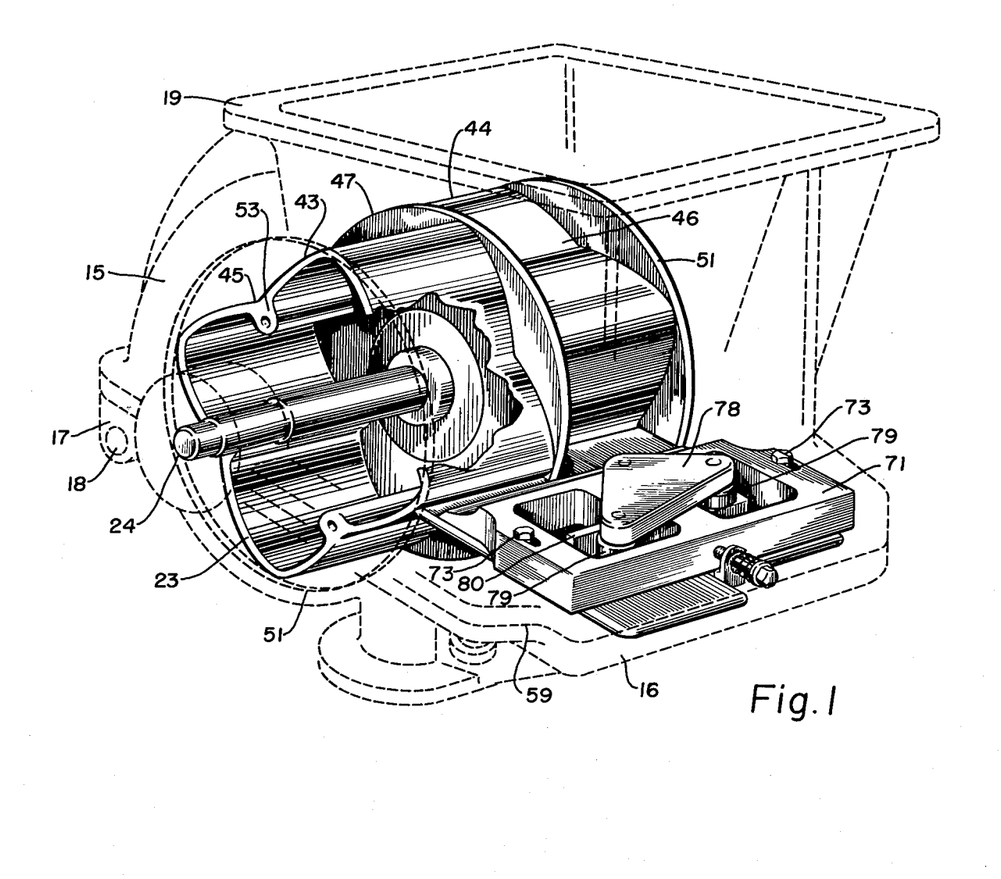
Figure 1 is a perspective view partly in section of the dough pump of the present invention.

The pump or rotor assembly 23 comprises a pair of elements or members 43 and 44 which have undulating peripheral surfaces defining pockets 45 and 46. The rotor members 43 and 44 are so mounted on the shaft 24 that the pockets 45 of one of the rotor members is out of phase or alignment with the pockets 46 of the other rotor member, as shown in Figure 1. The pocketed rotor members 43 and 44 are carried by a center member 47 which is formed with a hub 48 that is secured to the shaft 24 for rotation therewith by a suitable key 49, Figure 4. The center member 47 is of a diameter equivalent to the maximum diameter of the rotor members 43 and 44 and constitutes a dividing or separating member for the pockets 45 and 46 of the rotor members. The outer sides of the pocketed rotor members 43 and 44 are supported and closed by side discs 51 which are of the same diameter as the center member 47. The side discs 51 are formed with hubs 52 that are freely mounted on the shaft 24. The pocketed rotor members 43 and 44 have formed on their inner faces at their points of greatest depth or recession suitable webs 53 for the reception of bolts 54. The bolts 54 extend through one of the side discs 51, through one of the webs 53, the center member 47 and terminate in a threaded boss 55 provided on the inturned side portion 56 of one of the rotor members. As clearly shown in Figures 4 and 5 the connecting bolts 54 extend through a web provided on each rotor member at the base or bottom of each of the pockets 45 and 46. Thus upon rotation of the shaft 24 the rotor members 43 and 44 are rotated as a unit with the pockets 45 of the rotor member 43 being out of phase with the pockets 46 of the rotor member 44. The rotor members 43 and 44 are so mounted on the shaft 24 that the bottom of a pocket in one rotor member is almost but not quite in alignment with the peak or topmost point of one of the pockets on the other rotor member, as shown in Figure 4.

The lower portion 16 of the pump casing is secured to the upper portion 15 by hand screws 58, Figures 2 and 3, which extend through suitable bosses in the lower casing portion, not shown, and are threaded in the upper casing portion. Thus upon removing the screws 58 the lower casing portion 16 may be moved away from the upper casing portion 15 about the pin 18 whereby the lower casing portion may be readily cleaned as well as the upper casing portion and rotor assembly. Such an arrangement does not require the removal of the rotor assembly from the upper casing portion to permit a thorough cleaning thereof. The line or plane of separation between the upper and lower casing portions is indicated at 59 in Figure 4. The lower casing 16 is formed with a restricted or narrow section that fits closely with the side discs 51 of the rotor members 43 and 44, Figure 5, so that the longitudinal location of the rotor members on the shaft 24 is a function of the lower casing portion 16. The locating of the rotor members on the shaft 24 by the lower casing portion enables the bearings 28 to have a free floating fit within the bores 29. Furthermore, the close sliding fit between the side discs 51 and the lower casing portion 16 defines an entrapment zone or area 60, Figure 4, for the masses of dough carried in the pockets 45 and 46 of the rotor members 43 and 44.

The lower casing portion 16 diametrically opposite from the pivot pin 18 and along the plane of separation 59 is provided with a housing 62 which coincides with a complementary housing 63 formed in the upper casing portion 15. The housings 62 and 63 are designed to carry the stripper assembly for removing the masses of dough from the pockets 45 and 46 of the respective rotor members and delivering said dough to a separation zone 64. The separation zone 64 is the inner mouth of a delivery passage 65 formed in the lower casing portion for the ejection of the dough from the dough pump.

Figure 6:
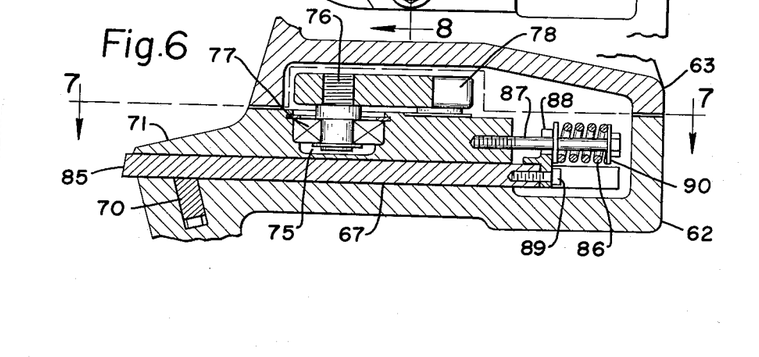
Figure 6 is a vertical sectional view of a portion of the stripper mechanism or assembly, the view being taken on a plane indicated by line 6—6 of Figure 7.
Figure 7:
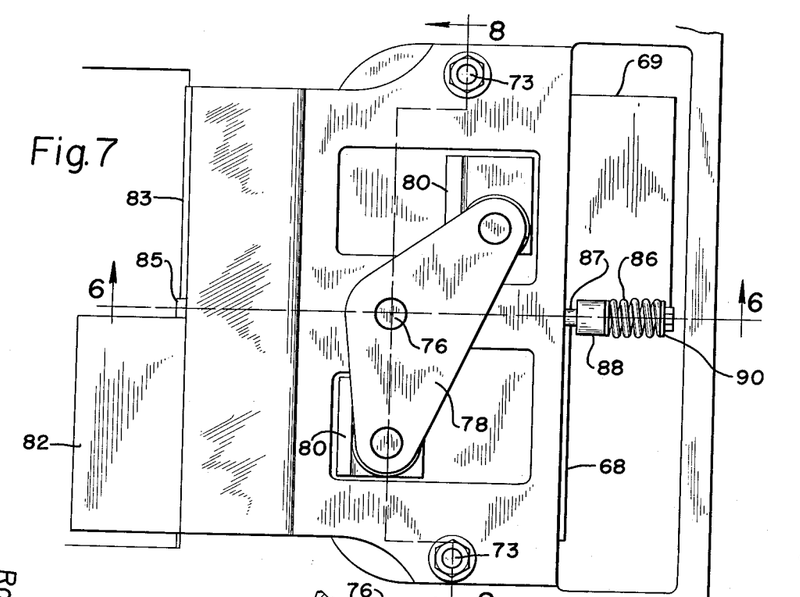
Figure 7 is a horizontal sectional view of the stripper mechanism or assembly, the view being taken on the irregular line 7—7 of Figure 6.

The housing 62 in the lower casing portion 16 is provided with a channel or slideway 67 within which are a pair of reciprocating stripper slides or members 68 and 69, Figures 4 and 7. The end portion of the housing 62, adjacent the separation zone 64, is provided with a suitable recess for the reception of a sealing element 70, Figures 4 and 6, which engages the lower faces of the stripper members 68 and 69 to prevent the passage of any dough into said housing. The upper faces of the stripper members bear against the lower face of a stripper assembly plate 71 that is adjustably mounted in a recess or channel 72 provided in the housing 62. The stripper assembly plate 71 is mounted in the recess 72 by suitable studs 73, Figure 8 and engages the upper casing portion 15 at the inner end of housing 63 along the plane of separation 59, Figure 4.

Figure 8:
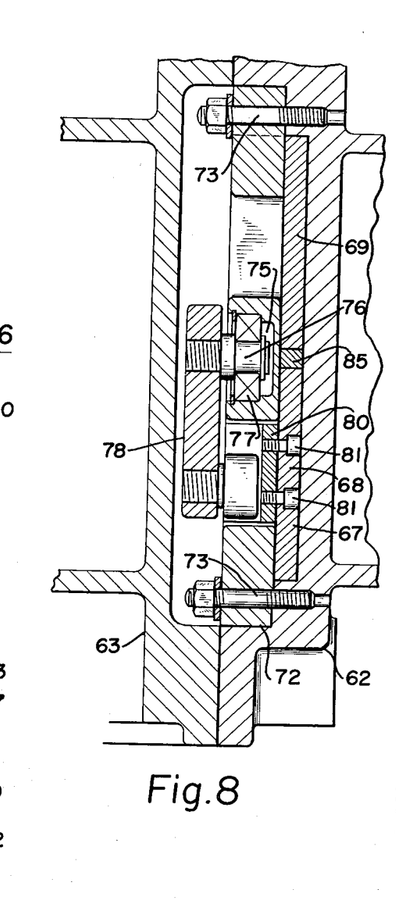
Figure 8 is a vertical sectional view of the stripper mechanism or assembly, the view being taken on the irregular line 8—8 of Figure 7.

The stripper assembly plate 71 is formed with a recess 75, Figure 8, within which a stud 76 is mounted in a suitable bearing 77. The stud 76 projects above the plate 71 and has mounted thereon a rocker 78 which carries at its respective ends and in triangular relationship to the stud 76 depending rollers 79. The rollers 79 project through suitable openings in the stripper assembly plate 71 and engage thrust blocks 80 which are secured by screws 81 to the stripper slides 68 and 69, Figure 8, adjacent their outer ends. The inner ends 82 and 83 of the stripper slides 68 and 69, respectively, engage the undulating surfaces of their respective rotor members 43 and 44 and upon the rotation of the rotor or pump assembly the ends 82 and 83 of the stripper slides move over or along the surface of each of the pockets 45 and 46 of the rotor members. The angularity of the rocker 78 is determined by the curvature of the rotor members 43 and 44 so that as the end of one of the stripper slides moves from the bottom of a pocket towards the top or point of the lobe the rocker 78 will pivot on the stud 76 and thereby cause the inner end of the other stripper slide to move from the top or point of the lobe to the bottom of the pocket.

The stripper slides 68 and 69 are maintained in spaced arrangement with one another and in proper alignment for engaging the pockets 45 and 46 of the respective rotor members by a spacing member 85, Figures 6, 7 and 8. The spacing member 85 is positioned between the stripper slides 68 and 69 in the channel or slideway 67, Figure 6, and is adapted to have an end thereof engage the peripheral edge of the center member 47 to prevent any dough contained in one of the pockets 45 from flowing or being moved over into one of the pockets 46. The sealing element 70, Figures 4 and 6, which engages the lower faces of the stripper slides 68 and 69 also engages the lower face of the spacing member 85 while the upper face or surface of the spacing member 85 bears against the lower face of the stripper assembly plate 71. The spacing member 85 is maintained in engagement with the center member 47 by means of a spring 86 carried by a stud 87 that is mounted in the outer or rear-end of the stripper assembly plate 71. A thrust block 88 slidably mounted on the stud 87 has a projection thereon that is secured to the spacing member 85 by a screw 89. Thus the spring 86 which is mounted on the stud 87 between the thrust block 88 and a washer 90 on the end of the stud urges the thrust block and spacing member 85 towards the rotor members for maintaining an end of the spacing member in engagement with the center member 47.

The upper casing portion 15 of the dough pump is formed with the side walls 25 and 26, Figure 5, which permits the dough mass to flow down upon and around the rotor members so as to completely enclose or cover the rotor members. In addition the upper casing portion is formed with an inclined side wall 92, Figure 4, which directs the dough from the hopper 21 to the top surfaces of the stripper plate assembly 71 and the stripper slides 68 and 69. The inclination of the side wall 92 insures that dough will be directed to the freshly stripped pockets 45 and 46 of the rotor members 43 and 44, respectively, so that all available space in the rotor pockets can be filled by dough flowing into them, thus avoiding the entrapment of air in the pockets.

The remaining side wall 93 of the upper casing portion 15 which is disposed in a plane substantially vertical to the horizontal axis of the rotor terminates in an arcuate segment which extends throughout the greater portion of its length. This arcuate segment of the side wall 93 is continued through a portion of the lower casing portion 16 where it terminates at a cutoff point 94. The side wall 93 throughout its arcuate configuration portion is spaced from the rotor members and defines with the rotor members an approach zone 95, Figure 4, which zone terminates at the cutoff point 94 in the lower casing portion 16. The side wall 93 is continued through the lower casing portion 16 from the cutoff point 94 to the separation zone 64 which is located at the inner end of the delivery passage 65. The portion of the side wall 93 which is continued as a side wall of the lower casing portion from the cutoff point 94 to the separation zone 64 is of such a configuration that the highest points or lobes of the pocketed rotor members 43 and 44 will have a sliding engagement with this portion of the side wall which has been referred to hereinbefore as the entrapment zone 60 for the dough contained in the rotor pockets 45 and 46.

In the operation of the dough pump of the present invention dough is delivered from the hopper 21 to the pump casing where it flows down the walls 25, 26, 92 and 93 to encompass the rotor members 43 and 44. Thus with the upper casing portion 15 full of dough the rotor members 43 and 44 are rotated through shaft 24 which is driven by motor 40 through sprockets 35—37 and sprocket chain 36. Assuming that as the dough pump is started that the rotor members 43 and 44 are in the position shown in Figure 4 at which time the stripper slide 68 is at the bottom of one of the pockets 45 so that the other stripper slide 69 through rocker 78 will be at the top or high point of one of the pockets 46.

As the rotor members 43 and 44 are rotated, in a counterclockwise direction when viewing Figure 4, the end 82 of stripper slide 68 will follow the contour of pocket 45 and move from the bottom to the top of the pocket while at the same time the end 83 of stripper slide 69 will move from the top to the bottom of pocket 46. As the end 82 of the stripper slide 68 moves out of the bottom of the pocket, Figure 4, dough will flow into said pocket and will continue to flow into and fill said pocket as the stripper slide 68 is moved back into the housing 62 as the end 82 approaches the top of the pocket. Upon the end 82 passing over the top or lobe of the pocket said pocket will be filled with dough. As the rotor members continue to rotate this pocket of dough and additional dough surrounding the rotor will be carried up and around and into the approach zone 95. As the pocketed dough moves through the approach zone 95 the dough surrounding the rotor is urged towards and into this zone by the drag created by the rotative movement of the rotor members. The pocketed dough is moved through the approach zone 95 to the cutoff point 94 so that as the trailing high point or lobe of this particular pocket of dough passes the cutoff point 94 the mass of dough contained in the pocket of the rotor member is under a pressure as it moves through the entrapment zone or area 60. The rotative movement of the rotor members in conveying the dough towards the approach zone causes the dough to be mixed and kneaded and this action continues as the dough is moved through the approach zone towards the entrapment zone.

The effect of the drag on the dough by the rotative movement of the rotor members moving through the approach zone 95 is to create a pressure at the cutoff point 94 which helps to insure that the trailing high point or lobe of each pocket as it passes over the cutoff point will maintain a full pocket of dough. The approach zone 95 permits a surplus of dough adhering to the rotor members and to the dough in the pocket to be urged towards the cutoff point 94 where the pocket passes into the entrapment zone 60. This action results in a positive pressure being developed at the cutoff point which assists in maintaining a full pocket at said point. To the extent that dough is carried towards or into the approach zone 95 in an amount beyond that required to maintain a full pocket, there will be a back flow of the surplus dough along the face of the upper casing portion 15. This back flow is opposed by a surface drag requiring pressure to overcome which will assist in maintaining a desired pressure at the cutoff point 94.

The pocket of dough in the rotor member 43 moves through the entrapment zone 60 to the separation zone 64. As the forward or leading crest or lobe of the dough pocket in rotor member 43 moves through the separation zone 43 the end 82 of the stripper plate 68 in following the contours of the pocketed rotor member 43 will move over said leading crest or lobe upon the continued rotation of rotor member 43. The end 82 of the stripper slide 68 will continue to follow the contours of the pocketed rotor member 43 and move down towards the bottom of the pocket of dough during which time the dough will be stripped from the pocket. Upon reaching the bottom of the pocket the end 82 of the stripper slide 68 will move up towards the trailing crest or lobe of the pocket so that as the end 82 moves over said trailing crest all of the dough will have been stripped from the pocket. The dough so stripped from the pocket will flow through the delivery passage 65 and out of the pump casing.

While the foregoing illustration of the operation of the dough pump has been directed more or less to a single pocket on one of the rotor members it is readily apparent that with the rotor members 43 and 44 moving at a constant speed and by having the pockets of one rotor member offset or out of phase with the pockets of the other rotor member there will be a constant discharge of dough through the discharge orifice 65. This is illustrated in the graph or chart of Figure 9 wherein the portion designated A would depict the travel of one rotor member with its stripper slide moving from the bottom of one pocket to the bottom of the next pocket. The portion of Figure 9 designated B would depict the travel of the other rotor member with its stripper slide moving from the crest of one pocket to the next pocket crest. This is due to the pockets of the rotor members being out of alignment or phase with one another so that when one stripper slide is at the bottom of a pocket the other stripper slide will be at the crest of a pocket. The portion of Figure 9 designated C is the total of A plus B, thus with the stripper slide of one rotor member being at the bottom of a pocket and removing dough therefrom at its maximum rate the other stripper slide would be at a crest of a pocket and not removing any dough. Such a condition would exist at the points $B_1$ and $B_2$ and $A_1$ and $A_2$, respectively, while at the points $B_3$ and $A_3$ the stripper slides would be in just the reverse position with respect to the bottom and crest of their respective pockets. At any other point on the chart of Figure 9 between the points $B_1$ and $B_3$ or $B_3$ and $B_2$ and $A_1$ and $A_3$ or $A_3$ and $A_2$ the stripper slides would be either moving towards or out of the bottom of a pocket and the summation of the dough being stripped from the two pockets would be at a constant rate as shown in the portion of the chart designated C.

Figures 9, 10:
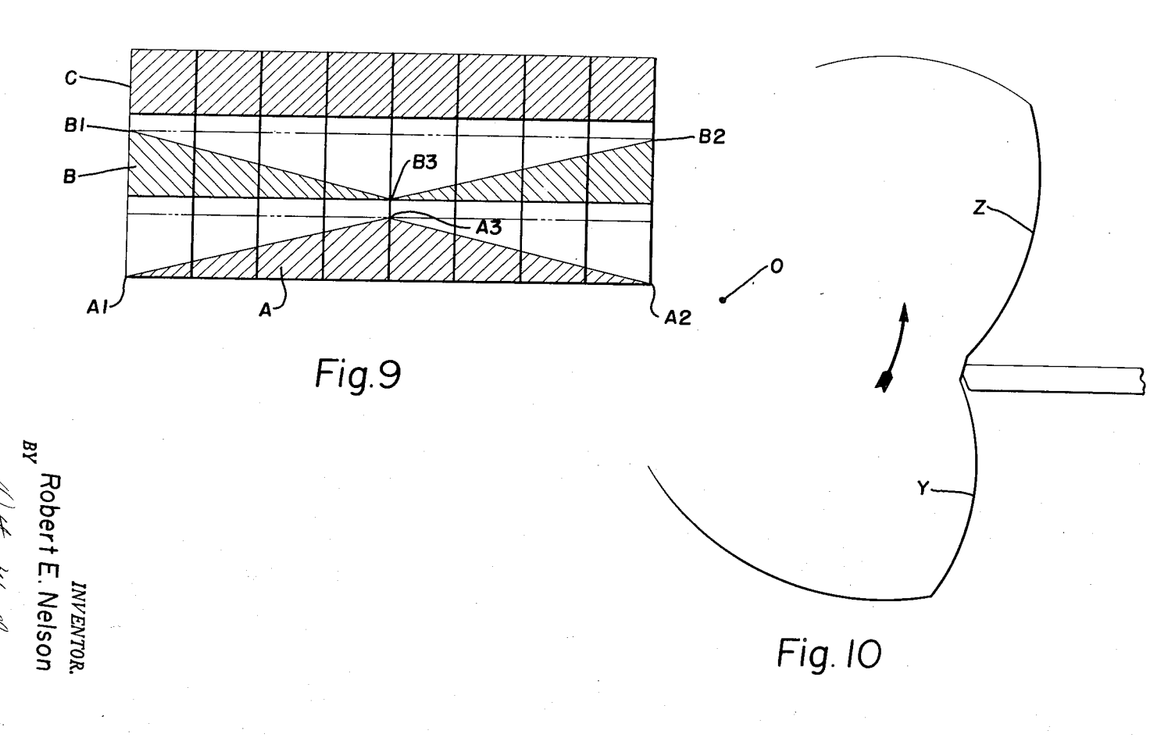
Figure 9 is a graphic representation showing the rate of delivery of material from each rotor during a portion of a complete revolution of each rotor.
Figure 10 is a layout diagram of a portion of a rotor showing a pocket between two crests on the rotor surface with the end of the stripper assembly in the pocket of the rotor.

In Figure 10 there is shown the layout of the curvature of the rotor members wherein the line of action of the stripper slide is offset below the center 0 of the rotor. This offsetting of the stripper slide not only improves the angularity of pressure of the end of the stripper slide on the rising curve of the rotor pocket but also enables the stripper assembly or mechanism to be mounted in and carried by the lower portion of the pump casing.

While as stated, it is desirable to have the line of action of the stripper slide offset below the center 0 of the rotor, it is apparent that the stripper slide may be located so that its line of action passes through the center 0 of the rotor. In the latter case the leading and trailing flanks of each lobe of the rotor would have the same curvature and the lobes would be symmetrical.

As shown, however, with the stripper slides 68 and 69 offset, the lobes of the rotor are asymmetrically formed so that as one stripper slide follows the leading flank of the lobe of one rotor and the other stripper slide follows the trailing flank of the lobe of the other rotor, the required constancy in total rates of displacement of the two stripper slides is obtained in accordance with the graphic illustration of Figure 9. The curve Y of the leading lobe flank may, within reasonable limits, be determined arbitrarily. In the present instance, an easily reproducible curve of constant radius was chosen. The curve Z on the trailing lobe flank is then plotted to give the required constancy in total rates of displacement of two strippers, one following line Y and the other line Z of two separate rotor elements.

Thus in the dough pump of the present invention the rotor members are formed with peripheral pockets disposed in out of phase relationship with one another for receiving dough. As the rotor members are rotated together by a common shaft the pocketed dough is moved towards and into a closely fitting portion of the pump casing which action places the pocketed dough under pressure due to the pumping of the dough into the pockets as said pockets approach and enter said portion of the pump casing. The continued rotation of the rotor members moves the pocketed dough into a separation zone where said dough is mechanically stripped from the pockets and delivered to a discharge orifice.

While in the preferred form of construction, as shown, the rotor members are displaced or out of phase with respect to each other, and the stripper slides are disposed in the same plane; this relation of elements may be reversed so that the rotor members are in line with respect to each other and the stripper slides are disposed in offset planes.

I claim:
1. A dough pump comprising a casing having inlet and outlet openings, a pair of rotors coaxially mounted in said casing and arranged to rotate as a unit, said rotors having a plurality of pockets formed in the peripheral surfaces thereof with the pockets in one rotor being out of alignment with the pockets in the other rotor, said pocketed rotors receiving a mass of dough from said inlet opening and conveying same to said outlet opening, a pair of plate members translatably mounted in said casing, each of said plate members having an end engageable with a respective rotor for following the contours of the pockets in said rotors for removing the mass of dough therefrom as each pocket of said rotors moves from the outlet opening towards said inlet opening and means connecting said plate members to impart a reciprocating motion of rectilinear translation thereto upon the rotation of said pocketed rotors.

2. A dough pump comprising a casing having inlet and outlet openings, a pair of rotors coaxially mounted in said casing and arranged to rotate as a unit, said rotors having a plurality of pockets formed in the peripheral surfaces thereof, said pocketed rotors receiving a mass of dough from said inlet opening and conveying same to said outlet opening, a pair of stripper plate members slidably mounted in said casing for motion of rectilinear translation toward and away from the peripheral surfaces of said rotors, each of said plate members having an end engageable with a respective rotor for following the contours of the pockets in said rotors for removing the mass of dough therefrom as each pocket of said rotors moves from the outlet opening towards said inlet opening, said plate members and the respective pocketed rotors engaged thereby being so arranged that the end of one of said plate members is at its point of deepest penetration in a pocket of its respective pocketed rotor at the same time that the end of the other plate member is at its point of least penetration in a pocket of its respective pocketed rotor.

3. A dough pump comprising a casing having inlet and outlet openings, a pair of rotors coaxially mounted in said casing and arranged to rotate as a unit, said rotors having a plurality of pockets formed in the peripheral surfaces thereof with the pockets in one rotor being out of alignment with the pockets in the other rotor, said pocketed rotors receiving a mass of dough from said inlet opening and conveying same to said outlet opening, a pair of plate members slidably mounted in said casing in parallel side by side relation with one another for motion of rectilinear translation respectively toward and away from the peripheral surfaces of said rotors, each of said plate members having an end engageable with a respective rotor for following the contours of the pockets in said rotors for removing the mass of dough therefrom as each pocket of said rotors moves from the outlet opening towards said inlet opening, said plate members being so arranged that the end of one of said plate members is at its point of deepest penetration in a pocket of one of said rotors at the same time that the end of the other plate member is at its point of least penetration in a pocket of the other of said rotors.

4. A dough pump comprising a casing having inlet and outlet openings, a pair of rotor members coaxially mounted in said casing and arranged to rotate as a unit, said rotor members having undulating peripheral surfaces defining pockets with the pockets of one rotor member being out of alignment with the pockets of the other rotor member, an annular wall between the adjacent ends of said rotor members separating the pockets thereof, the pockets of said rotor members receiving a mass of dough for conveying same to the outlet opening, said casing having a portion thereof slidably engaged by the sides of said rotor members and by the high points of said undulating surfaces and the periphery of said annular wall for entrapping masses of dough in said pockets prior to the delivery of said entrapped dough to the outlet opening and means mounted in said casing for reciprocating movement and engageable with the undulating surfaces of said rotor members for removing the mass of dough from said pockets as each pocket moves into communication with said outlet opening.

5. A dough pump comprising a casing having inlet and outlet openings, a pair of rotor members coaxially mounted in said casing and arranged to rotate as a unit, said rotor members having undulating peripheral surfaces defining pockets with the pockets of one rotor member being out of alignment with the pockets of the other rotor member, an annular wall between the adjacent ends of said rotor members separating the pockets thereof, the pockets of said rotor members receiving a mass of dough for conveying same to the outlet opening, said casing having an enlarged portion terminating in a reduced portion with the enlarged portion constituting an approach zone and the reduced portion constituting an entrapment zone, the sides and peripheral surfaces of said rotor members and the periphery of said annular wall having a sliding fit with the reduced portion of said casing, said rotor members in moving through the approach zone causing dough to be forced into said pockets under pressure as the pockets of the rotor members move into the entrapment zone, said rotor members upon continued rotation moving the pockets of dough into registry with the outlet opening, a pair of plate members slidably mounted in said casing in parallel side by side relation with one another for motion of rectilinear translation respectively toward and away from the peripheral surfaces of said rotor members, said plate members having an end engageable with the undulating surfaces of said rotor members for removing the dough from said pockets and delivering same to said outlet opening at a constant rate.

6. A dough pump comprising a casing having an upper portion and a lower portion with an inlet opening in the upper portion and an outlet opening in the lower portion, the lower portion of said casing having a narrow and restricted section, a pair of rotor members mounted in said upper portion and arranged to rotate as a unit, said rotor members having undulating peripheral surfaces defining pockets with high and low points, the pockets of one of said rotor members being out of alignment with the pockets of the other rotor member, the pockets of said rotor members receiving and conveying a mass of dough from the upper portion to the lower portion of said casing, said rotor members in their path of rotation moving the pockets of dough through the narrow and restricted section of the lower portion of the casing with the high points of the pockets slidably engaging the lower portion of the casing in said restricted section for entrapping under pressure the dough in the pockets, a pair of stripper members slidably mounted in said casing in spaced parallel relation with one another, each of said stripper members having an end engageable with the undulating surfaces of said rotor members for removing the dough from said pockets and delivering same to said outlet opening subsequent to said pockets passing said outlet opening, said stripper members being so arranged that the end of one of said stripper members is at its point of deepest penetration in a pocket of one of said rotor members at the time that the end of the other stripper member is at its point of least penetration in a pocket of the other of said rotor members.

7. A dough pump comprising a casing having an upper portion and a lower portion with an inlet opening in the upper portion and an outlet opening in the lower portion, the lower portion of said casing having a narrow and restricted section, a pair of rotor members mounted in said upper portion and arranged to rotate as a unit, said rotor members having undulating peripheral surfaces defining pockets with high and low points, the pockets of one of said rotor members being out of alignment with the pockets of the other rotor member, the pockets of said rotor members receiving and conveying a mass of dough from the upper portion to the lower portion of said casing, said rotor members in their path of rotation moving the pockets of dough through the narrow and restricted section of the lower portion of the casing with the high points of the pockets slidably engaging the lower portion of the casing in said restricted section for entrapping under pressure the dough in the pockets, a pair of stripper members slidably mounted in said casing in spaced parallel relation with one another, each of said stripper members having an end engageable with the undulating surfaces of said rotor members for removing the dough from said pockets and delivering same to said outlet opening subsequent to said pockets passing said outlet opening, said stripper members being so arranged that the end of one of said stripper members is at its point of deepest penetration in a pocket of one of said rotor members at the time that the end of the other stripper member is at its point of least penetration in a pocket of the other of said rotor members, and means connecting said stripper members to impart a reciprocatory movement from one stripper member to the other upon the rotation of said rotor members.

8. A dough pump comprising a casing having an upper and a lower portion with an inlet opening in the upper portion and an outlet opening in the lower portion, the upper portion of said casing having an arcuate section which terminates in a narrow and restricted section in the lower portion of said casing, a pair of rotor members mounted in said upper portion and arranged to rotate as a unit, said rotor members having undulating peripheral surfaces defining dough receiving pockets with high and low points, the pockets of one of said rotor members being out of alignment with the pockets of the other rotor member, the pockets of said rotor members during their path of rotation mixing and kneading the dough while conveying a mass of dough through the arcuate section of said upper portion and into the restricted section of said lower portion where the high points of said pockets slidably engage the restricted section of said lower portion for entrapping the mass of dough under pressure in the pockets, a pair of stripper members slidably mounted in said casing in spaced parallel relation with one another, each of said stripper members having an end engageable with the undulating surfaces of said rotor members for removing the dough from said pockets and delivering same to said outlet opening subsequent to said pockets passing said outlet opening, said stripper members being so arranged that the end of one of said stripper members is at the low point of a pocket of one of said rotor members at the time that the end of the other stripper member is at a high point in a pocket of the other of said rotor members, and a rocker member connecting said stripper members to impart a reciprocatory movement from one stripper member to the other upon the rotation of said rotor members.

9. A dough pump comprising a casing having an upper portion and a lower portion with an inlet opening in the upper portion and an outlet opening in the lower portion, the lower portion of said casing having a narrow and restricted section, a pair of rotor members mounted in said upper portion and arranged to rotate as a unit, said rotor members having undulating peripheral surfaces defining pockets with high and low points, the pockets of one of said rotor members being out of alignment with the pockets of the other rotor member, a center member interposed between and connected to said rotor members for rotation therewith, said center member separating the pockets of one of the rotor members from the pockets of the other rotor member, the pockets of said rotor members receiving and conveying a mass of dough from the upper portion to the lower portion of said casing while mixing and kneading the dough, said rotor members in their path of rotation moving the pockets of dough through the narrow and restricted section of the lower portion of the casing with the high points of the pockets slidably engaging the lower portion of the casing in said narrow section for entrapping under pressure the dough in the pockets, a pair of stripping members slidably mounted in said casing in spaced parallel relation with one another, each of said stripping members having an end engageable with the undulating surfaces of said rotor members for removing the dough from said pockets and delivering same to said outlet opening subsequent to said pockets passing said outlet opening, a spacing member interposed between said stripping members, spring means carried by said casing and connected to said spacing member for urging said spacing member into engagement with said center member.

10. A dough pump comprising a casing having an upper portion and a lower portion with an inlet opening in the upper portion and an outlet opening in the lower portion, the lower portion of said casing having a narrow and restricted section, a pair of rotor members mounted in said upper portion and arranged to rotate as a unit, said rotor members having undulating peripheral surfaces defining pockets with high and low points, the pockets of one of said rotor members being out of alignment with the pockets of the other rotor member, a center member interposed between and connected to said rotor members for rotation therewith, said center member separating the pockets of one of the rotor members from the pockets of the other rotor member, the pockets of said rotor members receiving and conveying a mass of dough from the upper portion to the lower portion of said casing while mixing and kneading the dough, said rotor members in their path of rotation moving the pockets of dough through the narrow and restricted section of the lower portion of the casing with the high points of the pockets slidably engaging the lower portion of the casing in said narrow section for entrapping under pressure the dough in the pockets, a pair of stripping members slidably mounted in said casing in spaced parallel relation with one another, each of said stripping members having an end engageable with the undulating surfaces of said rotor members for removing the dough from said pockets and delivering same to said outlet opening subsequent to said pockets passing said outlet opening, a spacing member interposed between said stripping members, spring means carried by said casing and connected to said spacing member for urging said spacing member into engagement with said center member, a rocker member carried by said casing, said rocker member having an end engageable with each of said stripping members for urging the end of one of said stripping members towards and into engagement with the undulating surface of one of said rotor members contemporaneous with the retraction of the other stripping member.

11. A dough pump comprising a casing having inlet and outlet openings, a pair of rotors coaxially mounted in said casing and arranged to rotate as a unit, each of said rotors having a plurality of identical asymmetric lobes forming therebetween pockets receiving dough from said inlet opening and conveying same to said outlet opening, the lobes of respective rotors being out of phase with respect to each other, a pair of stripper members translatably mounted in said casing in a common plane for motion of rectilinear translation and being engageable with respective rotors for removing dough from the pockets formed between said lobes, the plane of translatory movement of said stripper members being offset with respect to the axis of rotation of said rotors, and the contour of the flanks of said asymmetric lobes being such that the sums of the penetration of the respective stripper members in their respective rotor pockets is constant throughout rotation of said rotors, and the end of one of said stripper members is at its point of deepest penetration in a pocket of one of said rotor members at the time that the end of the other stripper member is at its point of least penetration in a pocket.

References Cited in the file of this patent

UNITED STATES PATENTS

| | | |
|---|---|---|
| 1,431,718 | Blum | Oct. 10, 1922 |
| 1,699,417 | Wilson | Jan. 15, 1929 |
| 1,777,178 | Pensotti | Sept. 30, 1930 |
| 1,973,225 | Paterson et al. | Sept. 11, 1934 |
| 2,221,328 | Rhodes | Nov. 12, 1940 |